United States Patent Office 3,354,117
Patented Nov. 21, 1967

3,354,117
STABILIZED POLYOLEFINS
Heinz Schmidt, Frankfurt am Main, Otto Mauz, Niederhofheim, Taunus, and Felix Schulde, Neuenhain, Taunus, Germany, assignors to Hercules Incorporated, Wilmington, Del., a corporation of Delaware
No Drawing. Filed Mar. 29, 1967, Ser. No. 626,714
Claims priority, application Germany, Aug. 27, 1960,
F 31,989
1 Claim. (Cl. 260—45.85)

ABSTRACT OF THE DISCLOSURE

A polyolefin composition stable to metal induced thermal decomposition containing, in addition to known stabilizers, an organic phosphorous compound prepared by condensing 3 moles of 4,4'-thio-bis(6-t-butyl-m-cresol) with 1 mole of $PCl_3$ or $POCl_3$.

---

This application is a continuation-in-part of our copending U.S. application Ser. No. 538,544, filed Mar. 30, 1966, which in turn was a continuation of Ser. No. 133,038, filed Aug. 22, 1961, entitled "Stabilized Polyolefins," both of which are now abandoned.

The present invention relates to stabilized polyolefins.

It is known that high-polymer substances are sensitive to the action of oxygen, heat and light and under such action undergo a decomposition which is evidenced by embrittlement. This is especially true of polymers of the olefin series. Polymers of ethylene prepared by the high pressure polymerization process as well as polymers of ethylene prepared by the low pressure polymerization process and polymers of α-olefins, for example, of propylene, butene and 4-methylpentene-1, which have been prepared by the low pressure polymerization process must therefore be protected against the action of heat, oxygen and light by the addititon of substances having a stabilizing effect.

For the stabilization of polyolefins there are used, for example, substituted phenols such as 2,6-di-t-butyl-p-cresol, or sulfur-containing phenolic compounds such as 4,4'-thio-bis-(6-t-butyl-m-cresol). Amines such as, for example, dinaphthyl-p-phenylene-diamine are also known as stabilizers. Compositions comprising a phenolic compound and an organic sulphidic compound produce especially good synergistic stabilization effects, in particular on polymers containing tertiary carbon atoms in the chain. In Belgian Patent 577,252 is described the use of the condensation product of nonyl phenol and acetone in combination with thio-dipropionic acid lauryl ester which enables the thermostability of polyolefins, in particular of polypropylene, to be considerably improved.

It is also known that the presence of certain metals, for example, copper and its alloys, manganese, cobalt and iron, considerably impairs the thermostability and the resistance to oxidation of polyolefins. Shaped articles of polyolefins, for example, which contain parts of the above-mentioned metals, have much worse aging properties. Polyolefins can therefore be used only to a limited extent as insulating material for the coating of electric conductors since at elevated temperatures an insulation of polyolefins which is in contact with the above-mentioned metals becomes brittle relatively quickly if it does not contain an appropriate stabilizer. Protective coatings which have been applied to metals by sintering in a fluidized bed become likewise brittle after a short time for the reason given above.

Now we have found that the thermostability of polyolefins, especially that of polyolefins containing tertiary carbon atoms in the polymer chain such, for example, as polypropylene, polybutene and poly-4-methylpentene-1, can be considerably improved, preferably in cases in which the said polyolefins are in contact with metals having a catalytic effect on the decomposition, for example, copper, manganese or the alloys thereof, by adding to the polyolefins containing known stabilizers as a co-stabilizer 0.1 to 2%, preferably 0.2 to 1%, of an organic phosphorus compound prepared by the reaction of $PCl_3$ or $O=PCl_3$ with 4,4'-thio-bis-(6-t-butyl-m-cresol). Serviceable stabilizers are obtained when the two compounds are reacted in molar proportions within the range of 6:1 to 3:2. Preferably, the stoichiometric molar proportion is 3:1.

The reaction products are predominantly compounds having approximately the following general formula when the molar proportion of reactants is about 3:1.

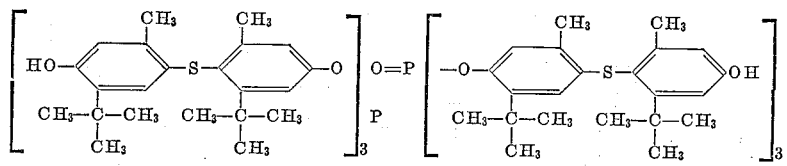

The compounds of the above classes can be used together with known stabilizers and filling materials such, for example, as carbon black, zinc oxide and zinc sulphide.

As known stabilizers which are particularly suitable there may be mentioned phenolic stabilizers, for example, the alkyl phenols containing up to 12 carbon atoms in the alkyl group, for example, p-t-butyl phenol, amyl phenol, p-octyl phenol, p-nonyl phenol, p-dodecyl phenol, 2,4-di-t-butyl phenol, 2,4-dioctyl phenol, dinonyl phenol, 2,4,6-tri-t-butyl-phenol, 2,6-di-t-butyl-p-cresol, nonyl-resorcinol, dodecyl hydroquinone and the bisphenols, for example, 4,4'-dioxy-diphenyl-dimethyl-methane,
bis-(4-oxy-3-methyl-phenyl)-propane-(2.2),
4,4'-dioxydiphenyl,
bis-(4-oxy-3,5-dimethyl-phenyl)-methane,
bis-(4-oxy-3,5-di-t-butyl-phenyl)-methane,
bis-(2-oxy-3-t-butyl-5-methyl-phenyl)-methane,
bis-(2-oxy-5-chlorophenyl)-methane,
bis(4-oxy-3-methyl-phenyl)-pentane,
bis-(2-oxy-phenyl)-cyclohexane,
4,4'-thiobis-(6-t-butyl-m-cresol).

Naphthols and bisnaphthols, for example, β-dinaphthol, bis-(2-oxy-naphthyl)-methane, bis-(2-oxy-3--nonyl-naphthyl)-methane; terpene-substituted phenols and bisphenols, for example, 6-isobornyl-o-cresol, 6-isobornyl-1,2,4-xylenol, 2,6-di-isobornyl-p-cresol, 6-isobornyl-3,4-dimethyl-phenol, 2,6-di-isobornyl - 3,4 - dimethyl - phenol, 6,6' - methylene - bis - (2-isobornyl-4-methylphenol), 6,6'-methylene-bis-(2,4-di-isobornyl-phenol).

The stabilizing effect obtained is particularly good when the co-stabilizers according to the invention are used in admixture with a composition containing up to about 0.5% of phenolic stabilizers and up to about 0.5% of organic sulphidic compounds. Particularly suitable sulphidic compounds are: thioethers, preferably those of aliphatic alcohols containing 4 to 18 carbon atoms such, for example, as di-octyl-sulphide, di-dodecyl-sulphide, di-octadecyl-sulphide and bis(2-oxy-naphthyl)-sulphide and the corresponding polythioethers, for example, di-dodecyl-disulphide, di-octyl-trisulphide, di-octadecyl-tetrasulphide, bis-(2-oxy-naphthyl)-disulphide; thio- and polythio-carboxylic acid alkyl esters, preferably those of aliphatic alcohols containing 4 to 18 carbon atoms such, for example, as thio-di-acetic acid dodecyl ester, thio-di-propionic acid lauryl ester, di-thio-di-butyric acid, octadecyl ester, di-thio-divaleric acid butyl ester, trithiodidecane-carboxylic acid nonyl ester, tetrathio-dibutyric acid octyl ester and s-t-butyl-mercapto-acetic acid lauryl ester.

It is particularly preferred to use the co-stabilizers according to the present invention in admixture with up to about 0.5% of the condensation product obtained from 2 mols of nonyl phenol and 1 mol of acetone (according to U.S. 3,020,259), or in admixture with the said condensation product and up to about 0.5% of thiodipropionic acid lauryl ester.

The low pressure polyolefins which are to be stabilized with the stabilizers according to the invention may be prepared according to the process described in Belgian Patent 538,782. Detailed statements concerning the preparation of polyolefins by the low pressure polymerization process can inter alia be found on pages 72 to 81 of the book by Raff and Allison entitled, "Polyethylene" (Interscience Publishers, 1956).

The stabilizers according to the invention are particularly suitable for the stabilization of homo- and copolymers of olefins, preferably polypropylene, which may contain monomer units other than olefins, and which are used for coating metals, for example, by sintering in a fluidized bed, or for insulating wires.

The embrittlement of plastic materials is ascertained by the so-called brittle test. In this test a strip of a foil about 1 mm. thick is stored in a warming cabinet and its flexibility is daily determined by bending it by hand at an angle of 180°. In the hand bending test the embrittlement of the plastic material is noticeable by rupture. Another way of examining in particular the behavior with respect to embrittlement of plastic materials used as insulating material of electrical conductors is the so-called "curl test." According to this method an electrical conductor which is coated with plastic material is wound up in narrow turns around its own axis and the "curl" thus obtained is stored in a warming cabinet. By the winding the plastic material is exposed to tensions. The brittleness can be noticed by cracks forming in the insulation. In order to examine the efficiency of stabilizers in the presence of metals, for example, copper, fine metal powder was added to the polyolefin, for example, polypropylene, and the embrittlement was determined by the hand bending test.

The co-stabilizers according to the invention may be added alone or in admixture with the other stabilizers, the substances being added in the pulverulent form to the pulverulent polymers in a high speed mixer or dissolved in an appropriate organic solvent and the resulting solution being added to the polymer. It is often suitable first to mix the stabilizer with a small quantity of the pulverulent polymer so that a polymer master batch is formed which contains 30 to 40% of stabilizer and which enables the desired concentration of stabilizer to be imparted to the total quantity of the polymer.

The stabilized powders were worked up on a heated press into foils 1 mm. thick under the following conditions:

Preheating for 10 minutes at 200° C. under contact pressure; pressing for 2 minutes at 200° C. under a pressure of 10 kg./cm.$^2$; cooling within 7 minutes under a pressure of 50 kg./cm.$^2$.

The following examples serve to illustrate the invention but they are not intended to limit it thereto, the parts being by weight and the percentages being likewise by weight and calculated on the quantity of polymer used.

*Examples 1 and 2*

The reaction product of 4,4'-thiobis-(6-t-butyl-m-cresol) and $PCl_3$ was prepared by reacting the two substances in a molar ratio of 3:1. The cresol derivative was dissolved at 110° C. in hot toluene and at this temperature $PCl_3$ was added dropwise while stirring. A vehement evolution of HCl set in. After the total quantity of $PCl_3$ had been added the whole was boiled for about two hours under reflux. The solvent was distilled off and a light resin remained as residue which, after cooling, was pulverized.

The following values were obtained by analysis:

| | Found (percent) | Calculated (percent) |
|---|---|---|
| Content of— | | |
| Cl | <0.2 | 0 |
| P | 2.8 | 2.8 |
| OH | 5.4 | 4.6 |

Substantially the same analysis was found when the reaction time was increased up to about 8 hours. Serviceable co-stabilizers were also obtained when the two compounds were reacted in molar proportions within the range of 6:1 to 3:2. Preferably, the stoichiometrical molar proportion was 3:1.

The following table illustrates the efficiency of the stabilizer system according to the invention, the efficiency being determined by the brittle test and the behavior with respect to embrittlement of a cable, stored in a warming cabinet. For the purpose of comparison, the efficiency of known stabilizers is indicated. The insulation of the cables used had a thickness of 0.6 mm. The copper conductor had diameter of 0.8 mm.

TABLE 1

[Brittle Times Measured With Pressed Foils and Cables Made of Polypropylene]

| Ex. No. | Stabilizer (chemical name) | Concentration in Percent by Weight | Brittle Time in Days at— | | Addition of 0.5% by weight of copper powder | | "Curl Test" (days to cracking) | |
|---|---|---|---|---|---|---|---|---|
| | | | 120° C. | 140° C. | 120° C. | 140° C. | 120° C. | 140° C. |
| A | 4,4'-thio-bis-(6-t-butyl-m-cresol) | 0.5 | 104 | 19 | 4 | 1 | 22 | 8 |
| B | Condensation product of nonyl phenol and acetone. | 0.5 | 31 | 4 | 2 | 1 | 7 | 2 |
| C | Condensation product of nonyl phenol and acetone+thiodipropionic acid lauryl ester. | 0.5+0.5 | 108 | 34 | 6 | 1 | 55 | 3 |
| 1 | Condensation product of nonyl phenol and acetone+reaction product of 4,4'-thio-bis-(6-t-butyl-m-cresol) with $PCl_3$. | 0.5+0.5 | 115 | 23 | 17 | 2 | | |
| 2 | Condensation product of nonyl phenol and acetone+thio-di-propionic acid lauryl ester+reaction product of 4,4'-thio-bis-(6-t-butyl-m-cresol) with $PCl_3$. | 0.5+0.5+0.5 | 190 | 60 | 130 | 7 | 168 | 35 |

What we claim and desire to protect by Letters Patent is:

A composition of matter comprising polypropylene; about 0.1 to 2% based on the weight of polypropylene of the reaction product obtained by refluxing 4,4'-thiobis(6-t-butyl-m-cresol) in toluene for about 2 to about 8 hours with a phosphorous compound selected from the class consisting of $PCl_3$ and $O=PCl_3$, said 4,4'-thiobis(6-t-butyl-m-cresol) and said phosphorous compound being reacted in a molar ratio of about 3:1; up to about 0.5% of the condensation product of 2 moles of nonyl phenol and 1 mole of acetone; and up to about 0.5% of dilauryl thiodipropionate.

References Cited

UNITED STATES PATENTS

| | | | |
|---|---|---|---|
| 2,839,563 | 6/1958 | Hechenbleikner | 260—41 |
| 3,124,551 | 3/1964 | Warren | 260—45.95 X |

DONALD E. CZAJA, *Primary Examiner.*

L. J. BERCOVITZ, *Examiner.*

M. J. WELSH, *Assistant Examiner.*